(12) United States Patent
Kulkarni et al.

(10) Patent No.: US 10,279,754 B2
(45) Date of Patent: May 7, 2019

(54) SEAL FOR VARIABLE DYNAMIC GAPS

(71) Applicant: Toyota Motor Engineering & Manufacturing North America, Inc., Erlanger, KY (US)

(72) Inventors: Mohan Ramachandra Kulkarni, Novi, MI (US); James D. Cunningham, Clarkston, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 299 days.

(21) Appl. No.: 15/214,957

(22) Filed: Jul. 20, 2016

(65) Prior Publication Data
US 2018/0022297 A1   Jan. 25, 2018

(51) Int. Cl.
| | |
|---|---|
| *B60R 13/06* | (2006.01) |
| *F16J 15/02* | (2006.01) |
| *F16J 15/44* | (2006.01) |
| *B60R 19/02* | (2006.01) |
| *B60R 19/18* | (2006.01) |

(52) U.S. Cl.
CPC ............. *B60R 13/06* (2013.01); *F16J 15/022* (2013.01); *F16J 15/44* (2013.01); *B60R 19/02* (2013.01); *B60R 2019/1886* (2013.01); *F16J 15/445* (2013.01)

(58) Field of Classification Search
CPC ........ F16J 15/022; F16J 15/441; F16J 15/445; B60R 2019/1886; B60R 13/06; B60R 19/02
See application file for complete search history.

(56) References Cited

U.S. PATENT DOCUMENTS

| | | | | |
|---|---|---|---|---|
| 3,823,950 A | * | 7/1974 | Pedersen | F01D 11/025 277/415 |
| 4,472,469 A | * | 9/1984 | Thies | B60J 10/16 428/122 |
| 4,475,766 A | * | 10/1984 | McKee | B60R 13/07 296/213 |
| 4,982,889 A | * | 1/1991 | Eardley | F01D 11/005 277/579 |
| 5,603,510 A | * | 2/1997 | Sanders | F01D 11/025 277/413 |

(Continued)

OTHER PUBLICATIONS

U.S. Appl. No. 15/079,898, filed Mar. 24, 2016.

*Primary Examiner* — Nicholas L Foster
(74) *Attorney, Agent, or Firm* — Christopher G. Darrow; Darrow Mustafa PC

(57) ABSTRACT

A sealing system can be used between a first vehicle component and a second vehicle component. As an example, the first vehicle component can be a filler panel, and the second vehicle component can be a bumper panel. The first vehicle component and the second vehicle component can be spaced from each other such that a gap is formed between the first vehicle component and the second vehicle component. A seal can be operatively positioned at least partially between the first vehicle component and the second vehicle component to close at least a portion of the gap. The interface seal can be floatingly connected to the first vehicle component. The interface seal can be unconnected to the second vehicle component. The interface seal can be substantially adjacent to the second vehicle component.

20 Claims, 7 Drawing Sheets

(56) References Cited

U.S. PATENT DOCUMENTS

| | | | |
|---|---|---|---|
| 6,502,823 B1 * | 1/2003 | Turnquist | F01D 11/025 277/355 |
| 6,617,015 B2 | 9/2003 | Rood | |
| 6,849,310 B2 | 2/2005 | Willett | |
| 7,066,470 B2 * | 6/2006 | Turnquist | F01D 11/025 277/355 |
| 7,093,835 B2 * | 8/2006 | Addis | F01D 11/005 277/355 |
| 7,900,982 B2 | 3/2011 | Moore | |
| 8,573,682 B2 | 11/2013 | Oomen | |
| 8,915,538 B2 | 12/2014 | Bland et al. | |
| 9,097,130 B2 * | 8/2015 | Willis | F01D 11/005 |
| 9,243,510 B2 * | 1/2016 | Casavant | F01D 11/005 |
| 9,637,181 B1 * | 5/2017 | Cunningham | B60R 13/06 |
| 9,688,136 B2 * | 6/2017 | Roth | B60K 15/05 |
| 9,731,776 B1 * | 8/2017 | Shen | B60R 19/023 |
| 2004/0041348 A1 * | 3/2004 | Addis | F01D 11/005 277/355 |
| 2004/0100035 A1 * | 5/2004 | Turnquist | F01D 11/025 277/412 |
| 2010/0181785 A1 * | 7/2010 | Moore | B29C 33/44 293/120 |
| 2011/0198778 A1 | 8/2011 | Bellmore et al. | |
| 2012/0193156 A1 | 8/2012 | Hirano | |
| 2014/0069103 A1 * | 3/2014 | Willis | F01D 11/005 60/740 |
| 2014/0072418 A1 * | 3/2014 | Casavant | F16J 15/3288 415/182.1 |
| 2015/0123310 A1 | 5/2015 | Leonard | |
| 2015/0274010 A1 * | 10/2015 | Roth | B60K 15/05 220/86.2 |

* cited by examiner

SEAL FOR VARIABLE DYNAMIC GAPS

FIELD

The subject matter described herein relates in general to seals and, more particularly, to seals for gaps at the interface between vehicle components.

BACKGROUND

Some vehicles, such as some trucks and utility vehicles, are built using a body-on-frame construction. In such cases, a plurality of individual body panels are mounted on a rigid frame. Relatively large nominal gaps are provided between neighboring body panels due to large assembly variation and dynamic gap requirements during vehicle operation.

SUMMARY

In one respect, the present disclosure is directed to a sealing system for a vehicle. The system can include a first vehicle component and a second vehicle component. The first vehicle component and the second vehicle component can be spaced from each other such that a gap is formed between the first vehicle component and the second vehicle component. The system can also include an interface seal. The interface seal can be operatively positioned at least partially between the first vehicle component and the second vehicle component. The interface seal can close at least a portion of the gap. The interface seal can be floatingly connected to the first vehicle component. The interface seal can be substantially adjacent to the second vehicle component. The interface seal can be unconnected to the second vehicle component.

In another respect, the present disclosure is directed to a vehicle. The vehicle can include a first vehicle component and a second vehicle component. The first vehicle component and the second vehicle component can be spaced from each other in a substantially vertical direction. A gap can be formed between the first vehicle component and the second vehicle component. The gap can have an associated width. The width of the gap can be variable during operation of the vehicle. An interface seal can be operatively positioned at least partially between the first vehicle component and the second vehicle component to close at least a portion of the gap. The interface seal can include a first end region, a second end region, and a central portion that connects the first end region and the second end region. The first end region can include a first transverse member. The central portion of the interface seal can taper in the direction from the second end region to the first end region. The interface seal can be floatingly connected to the first vehicle component. The interface seal can be substantially adjacent to the second vehicle component. The interface seal can be unconnected to the second vehicle component.

DETAILED DESCRIPTION

Figure 1:
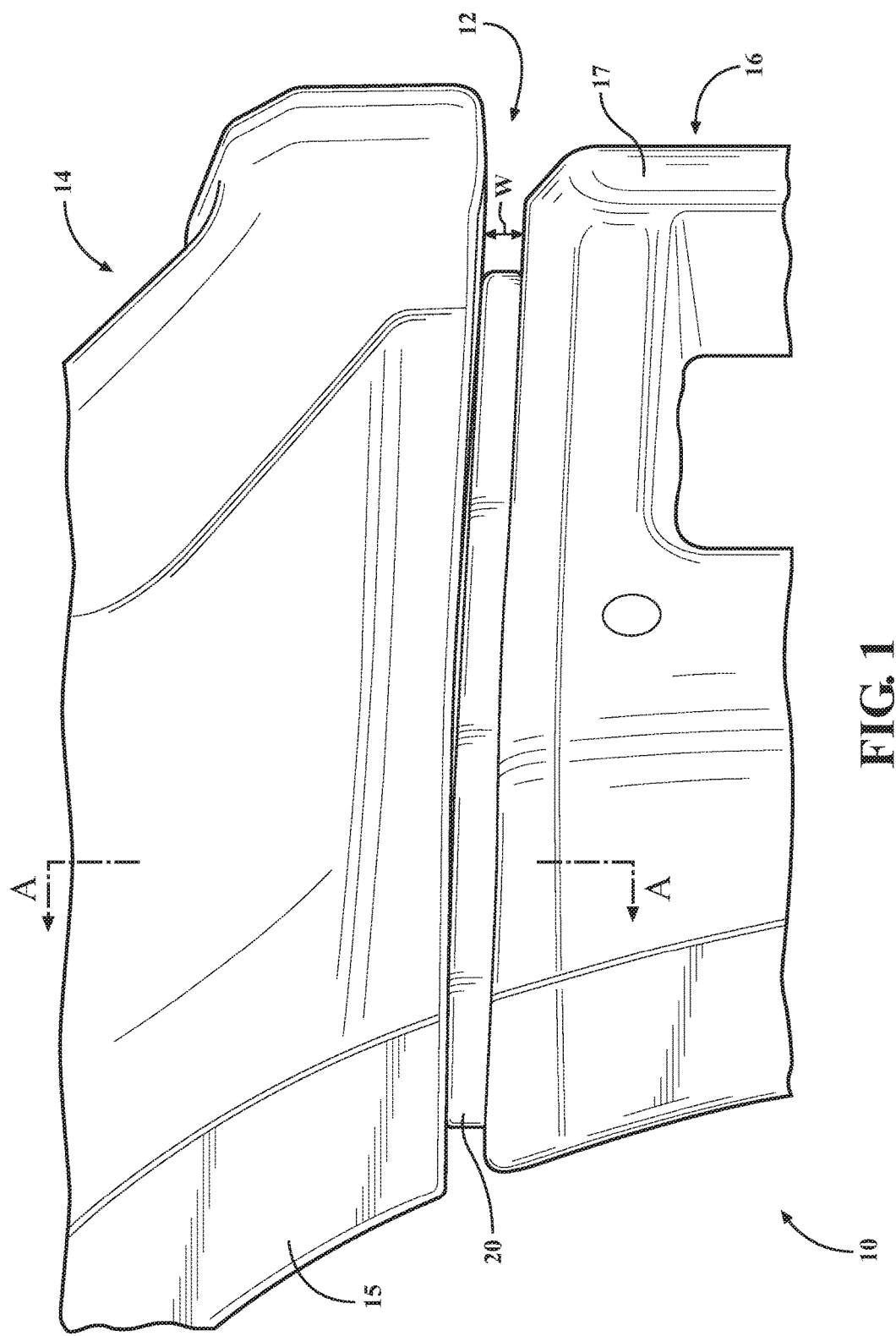
FIG. 1 is an example of a portion of a vehicle, showing a gap formed at an interface between two vehicle components.

This detailed description relates to seals for gaps formed at the interface between vehicle components. In one or more arrangements, a first vehicle component and a second vehicle component can be spaced from each other such that a gap is formed between the first vehicle component and the second vehicle component. The system can also include an interface seal. The interface seal can be operatively positioned at least partially between the first vehicle component and the second vehicle component to close at least a portion of the gap. The interface seal can be floatingly connected to the first vehicle component. A portion of the interface seal can be substantially adjacent to the second vehicle component. The interface seal can be unconnected to the second vehicle component. The present detailed description relates to apparatus and/or systems that incorporate one or more of such features. In at least some instances, arrangements described herein can reduce airflow and turbulence at a front end of a vehicle, which can result in, for example, improved vehicle aerodynamics, increased gas mileage, and/or overall vehicle efficiencies.

Detailed embodiments are disclosed herein; however, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-9, but the embodiments are not limited to the illustrated structure or application.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details.

An interface seal as described herein can be used with respect to a gap formed between two components in various applications. For instance, the interface seal can be used in connection with a vehicle. One example of a vehicular environment in which such a seal can be used will now be described with respect to FIG. 1. However, it will be understood that arrangements described herein are not limited to the particular vehicular application shown. Also, it will be understood that arrangements described herein can be used in one or more non-vehicular applications.

FIG. 1 shows an example of a portion of a vehicle 10 in which an interface seal can be used. As used herein, "vehicle" means any form of motorized transport. In one or more implementations, the vehicle 10 can be an automobile. While arrangements will be described herein with respect to automobiles, it will be understood that embodiments are not limited to automobiles. In some implementations, the vehicle 10 may be a watercraft, an aircraft, a train, or any other form of motorized transport.

The vehicle 10 can include a first vehicle component 14 and a second vehicle component 16. The first vehicle component 14 and the second vehicle component 16 can be any suitable vehicle components. For example, the first vehicle component 14 and the second vehicle component 16 can be located on and/or can define at least in part an exterior of the vehicle 10. In one or more arrangements, the first vehicle component 14 can be a filler panel 15, a body garnish, or an exterior body panel. In one or more arrangements, the second vehicle component 16 can be a bumper panel 17, a front bumper, a front bumper cover, or an exterior body panel.

In one or more arrangements, the first vehicle component 14 and/or the second vehicle component 16 can be operatively connected to one or more vehicle structures. The term "operatively connected," as used throughout this description, can include direct or indirect connections, including connections without direct physical contact. The first vehicle component 14 and the second vehicle component 16 can be operatively connected to the same structure. Alternatively, the first vehicle component 14 and the second vehicle component 16 can be operatively connected to different structures. For example, in one or more arrangements, the first vehicle component 14 can be attached to a vehicle upper body, and the second vehicle component 16 can be attached to a vehicle frame.

The first vehicle component 14 and the second vehicle component 16 can be arranged relative to each other in any suitable manner. The first vehicle component 14 and the second vehicle component 16 can be spaced from each other in one or more directions. In the example shown in FIG. 1, the first vehicle component 14 and the second vehicle component 16 can be spaced from each other in the substantially vertical direction. As used herein, the term "substantially" includes exactly the term it modifies and slight variations therefrom. However, in other arrangements, the first vehicle component 14 and the second vehicle component 16 can be spaced from each other in a substantially horizontal direction. Still further, the first vehicle component 14 and the second vehicle component 16 can be spaced from each other in a plurality of directions.

An interface gap 12 can be formed by the spacing between the first vehicle component 14 and the second vehicle component 16. The interface gap 12 can have an associated width W. The width W of the interface gap 12 can be substantially uniform along the interface between the first vehicle component 14 and the second vehicle component 16. In the particular arrangement shown in FIG. 1, the interface gap 12 can extend in a substantially horizontal direction.

In one or more arrangements, the first vehicle component 14 and/or the second vehicle component 16 can move relative to each other at least during the operation of the vehicle 10. Thus, the width W of the interface gap 12 can vary. The presence of the interface gap 12 can negatively influence the vehicle aerodynamics, which, in turn, can lower gas mileage and overall vehicle efficiencies. In addition, the presence of the interface gap 12 may not be visually appealing.

There can be relatively large amounts of relative movement between the first vehicle component 14 and the second vehicle component 16 when they are operatively connected to different structures. For instance, the first vehicle component 14 and the second vehicle component 16 can move relative to each other in the substantially vertical direction (e.g., up and down on the page in FIG. 1). In one or more arrangements, the range of relative motion between the first vehicle component 14 and the second vehicle component 16 in the substantial vertical direction can be about +/−10 millimeters. Further, the first vehicle component 14 and the second vehicle component 16 can move relative to each other in the substantially longitudinal direction of the vehicle 10 (e.g., into and out of the page in FIG. 1). In one or more arrangements, the range of relative motion between the first vehicle component 14 and the second vehicle component 16 in the substantial longitudinal direction can be about +/−6 millimeters.

Figure 8:
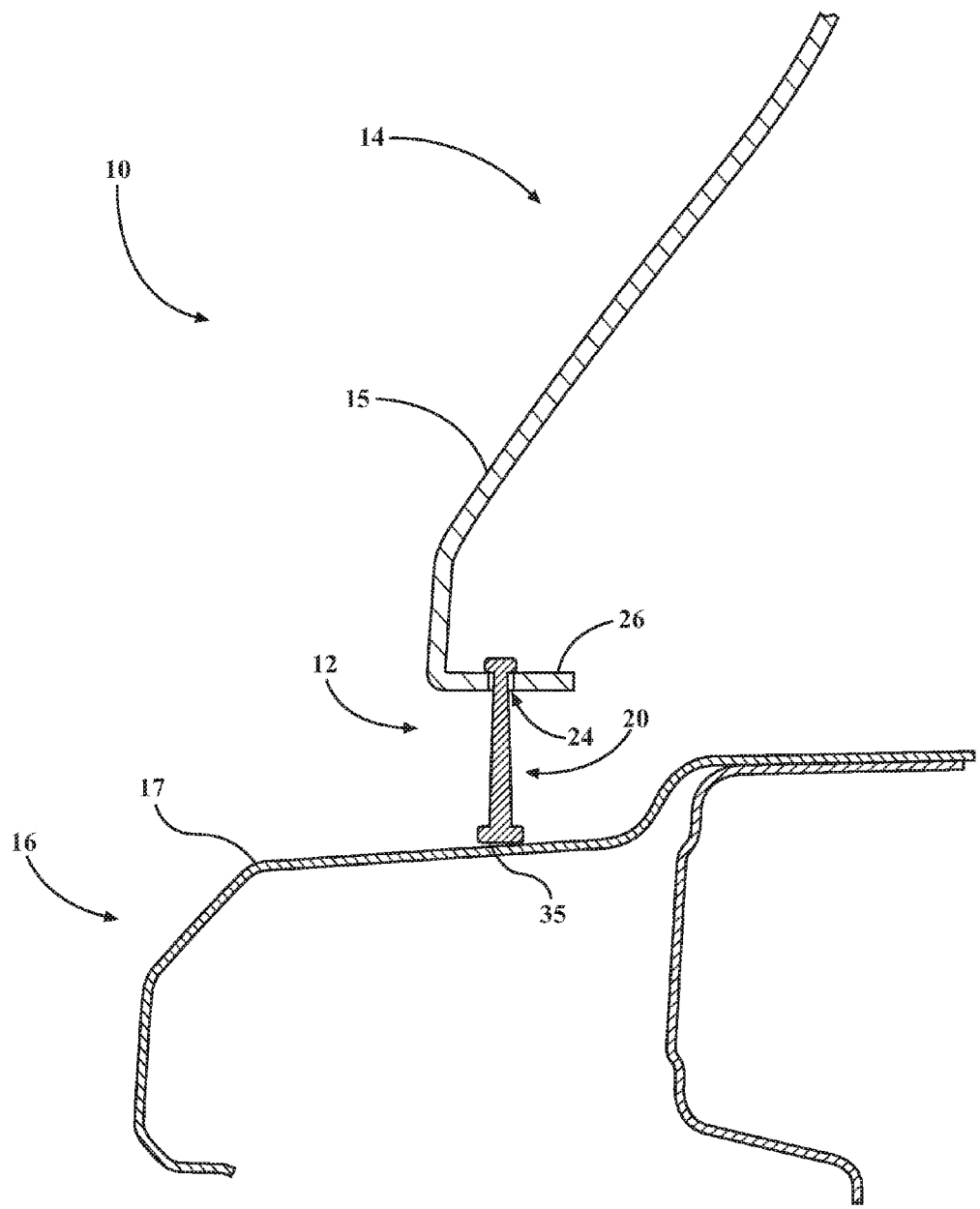
FIG. 8 is a cross-sectional view of the interface between two vehicle components, viewed along line A-A in FIG. 1 and showing an example of a maximum gap condition between the two vehicle components.
Figure 9:
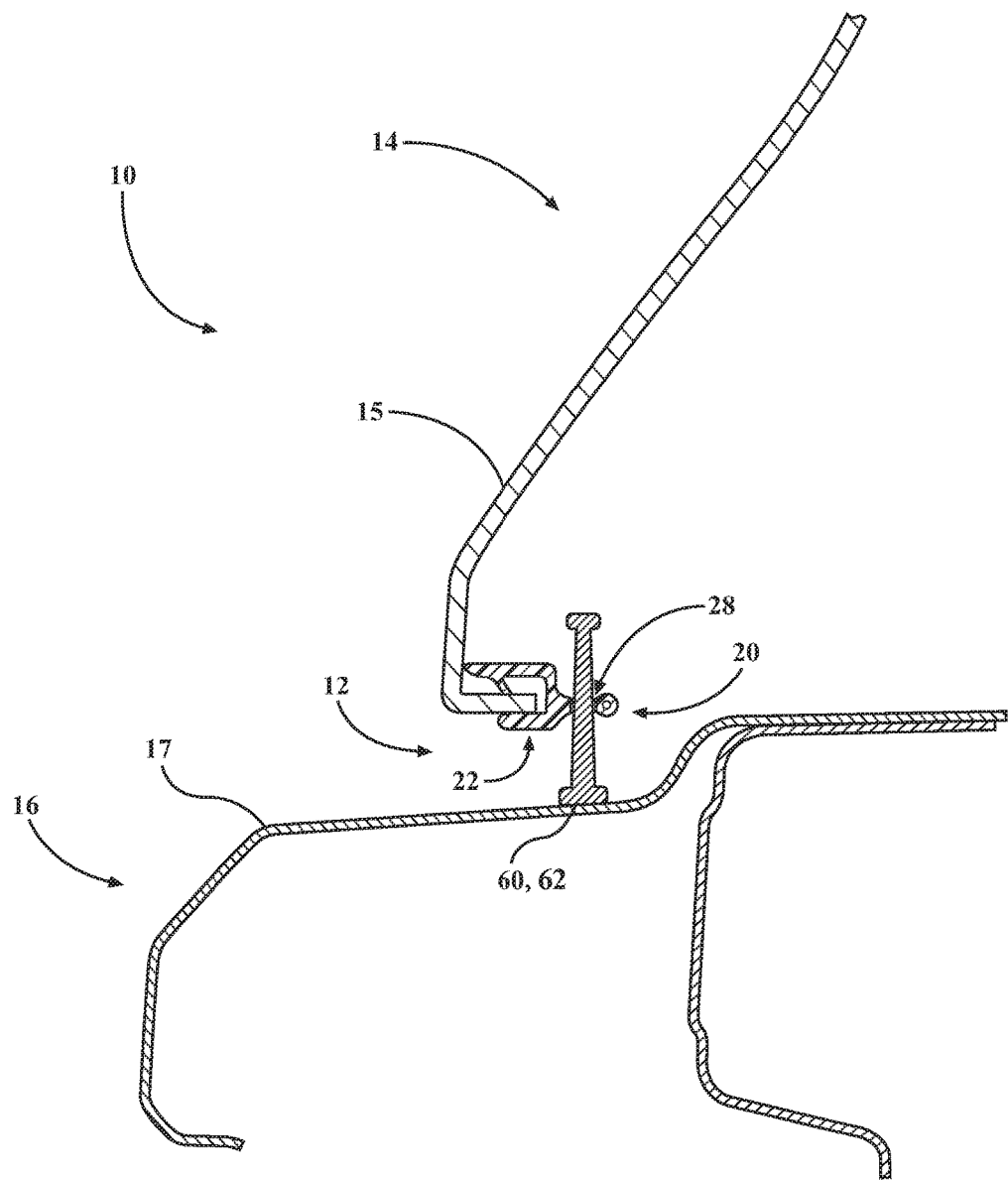
FIG. 9 is a cross-sectional view of the interface between two vehicle components, viewed along line A-A in FIG. 1 and showing an example of an interface seal indirectly floatingly connected to a first vehicle component.

According to arrangements herein, an interface seal 20 can be operatively positioned to close the interface gap 12 or at least reduce the size of the interface gap 12 during operation of the vehicle 10. In one or more arrangements, the interface seal 20 can be operatively positioned within the interface gap 12 without making any modifications to the first vehicle component 14 and the second vehicle component 16. One example of such an arrangement is shown in FIG. 9. In such case, a separate connecting member 22 can be used to operatively connect the interface seal 20 to the first vehicle component 14 or the second vehicle component 16. In one or more arrangements, the first vehicle component 14 and/or the second vehicle component 16 can be modified to accommodate the interface seal 20. For example, in one or more arrangements, one or more apertures 24 (see, e.g., FIGS. 6-8) can be formed in the first vehicle component 14, as will be explained in greater detail.

According to arrangements herein, the interface seal 20 can be free-floating with respect to the first vehicle component 14 and/or the second vehicle component 16. "Free-floating" means that no fasteners or adhesives are used to attach the interface seal to the structures forming the gap (e.g., the first vehicle component 14 and the second vehicle component 16). As a result, the interface seal 20 can be allowed to move relative to the structures forming the interface gap 12, and/or the structures forming the interface gap 12 can move relative to the interface seal 20.

Figure 2:
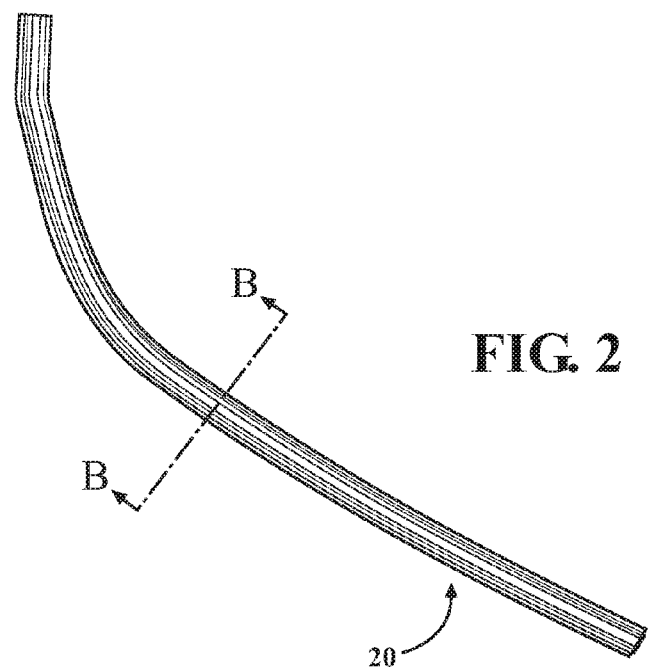
FIG. 2 is an example of an interface seal.

FIG. 2 shows one example of the interface seal 20. The interface seal 20 can be made of any suitable material. For instance, in one or more arrangements, the interface seal 20 can be made of ethylene propylene diene monomer rubber (EPDM). In one or more arrangements, interface seal 20 can be made of dense EPDM. In one or more arrangements, the interface seal 20 can be made of polypropylene (PP) or polyvinylchloride (PVC). In one or more arrangements, the interface seal can be made of a material that does not compress or is resistant to compression.

The interface seal 20 can be made using any suitable process, including, for example, by extrusion or by injection molding. In one or more arrangements, the interface seal 20 can be formed as a single piece. In one or more arrangements, the interface seal 20 can be made of a plurality of separate pieces. The plurality of separate pieces can be joined together in any suitable manner, including, for example, adhesives and/or one or more fasteners. In one or more arrangements, the interface seal 20 and the first vehicle component 14 can be provided together as a sub-assembly. For instance, the interface seal 20 can be floatingly connected to the first vehicle component 14, as will be described herein.

The interface seal 20 can extend substantially linearly along its length. In one or more arrangements, the interface seal 20 can extend non-linearly along at least a portion of its length, as is shown in FIG. 2. In one or more arrangements, the interface seal 20 can be made of a material that allows the interface seal 20 to be flexible along its length and/or in one or more other directions.

The interface seal 20 can have any suitable size, shape, and/or configuration. In one or more arrangements, the interface seal 20 can have any suitable cross-sectional shape. For instance, in one or more arrangements, the interface seal 20 can have a substantially I-shaped cross-sectional shape. In one or more arrangements, the interface seal 20 can have a substantially T-shaped cross-sectional shape.

Figure 3:
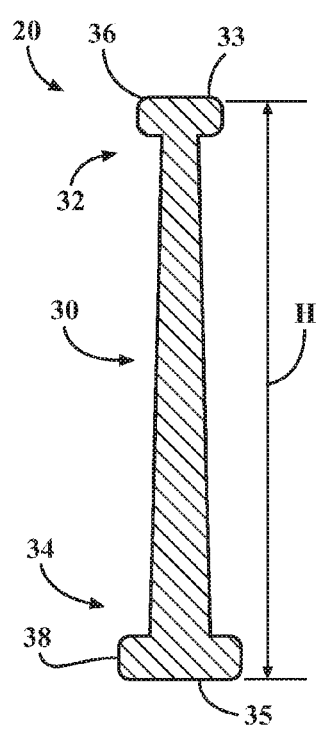
FIG. 3 is an example of a cross-sectional view of the interface seal, viewed along line B-B in FIG. 2.
Figure 4:
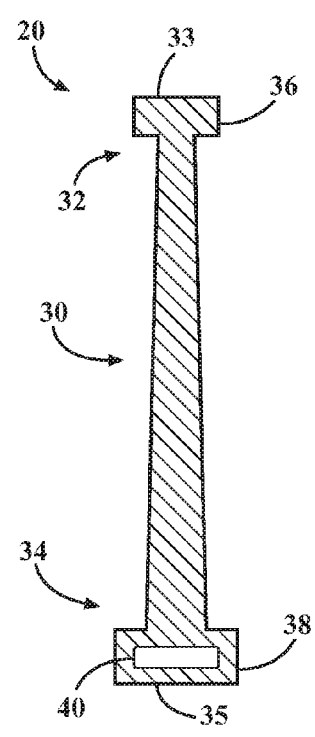
FIG. 4 is an example of a cross-sectional view of the interface seal, viewed along line B-B in FIG. 2.
Figure 5:
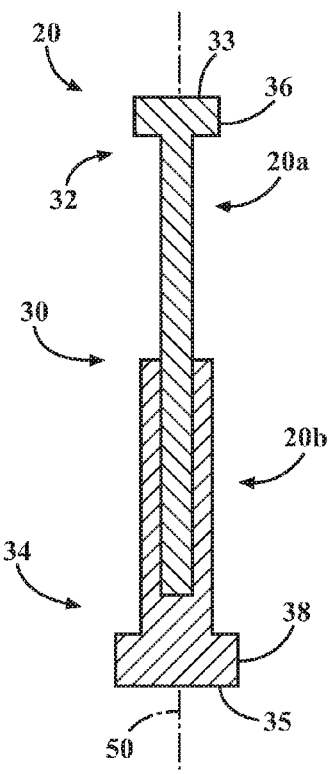
FIG. 5 is an example of a cross-sectional view of the interface seal, viewed along line B-B in FIG. 2.

Various examples of the interface seal 20 are shown in FIGS. 3-5, which show a cross-sectional view of the interface seal 20, viewed along line B-B in FIG. 2. Referring to FIG. 3, the interface seal 20 can include a central member 30, a first end region 32, and a second end region 34. The first end region 32 and the second end region 34 can be on opposite ends of the central member 30. The first end region 32 can define a first end 33 of the interface seal 20. The second end region 34 can define a second end 35 of the interface seal 20. The first end 33 and the second end 35 can have any suitable configuration. For instance, the first end 33 and/or the second end 35 can be substantially planar. In one or more arrangements, at least a portion of the first end 33 and/or the second end 35 can be non-planar. For example, at least a portion of the first end 33 and/or the second end 35 can be curved.

The central member 30 can be substantially straight. In one or more arrangements, at least a portion of the central member 30 can be non-straight. In one or more arrangements, the central member 30 can have a substantially uniform cross-sectional shape. In one or more arrangements, the central member 30 can be tapered. For instance, the central member 30 can taper from the second end region 34 to the first end region 32, as is shown in FIG. 3. As a result, the central member 30 can be wider at or near the second end region 34 than it is at or near the first end region 32.

In one or more arrangements, the first end region 32 can include a first transverse member 36. The first transverse member 36 can be configured in any suitable manner. For instance, the first transverse member 36 can be generally rectangular in cross-sectional shape, as is shown in FIG. 4. However, other cross-sectional shapes are possible, such as substantially circular, substantially oval, substantially polygonal, substantially triangular, and/or substantially obround, just to name a few possibilities.

In one or more arrangements, the second end region 34 can include a second transverse member 38. The second transverse member 38 can be configured in any suitable manner. For instance, the second transverse member 38 can be generally rectangular in cross-sectional shape, as is shown in FIG. 4. However, other cross-sectional shapes are possible, such as substantially circular, substantially oval, substantially polygonal, substantially triangular, and/or substantially obround, just to name a few possibilities. When the interface seal 20 includes the first transverse member 36 and the second transverse member 38, the interface seal 20 can, in some instances, have a substantially I-shaped cross-sectional shape.

The first transverse member 36 and the second transverse member 38 can be substantially identical to each other. Alternatively, the first transverse member 36 and the second transverse member 38 can be different from each other in one or more respects. For instance, the first transverse member 36 and the second transverse member 38 can have different sizes and/or shapes.

In one or more arrangements, first transverse member 36 and the second transverse member 38 can be configured to have different weights. More particularly, the first transverse member 36 and the second transverse member 38 can be configured so that the second transverse member 38 has a greater weight than the first transverse member 36. As an example, the second transverse member 38 can be larger than the first transverse member 36, as is shown in FIG. 3. Alternatively or in addition, an insert 40 can be operatively connected to the second transverse member 38, as is shown in FIG. 4, so as to increase the weight of the second transverse member 38. The insert 40 can be made of any suitable material, including, for example, one or more metals. The insert 40 can be operatively connected to the second transverse member 38 in any suitable manner. For instance, in one or more arrangements, the insert 40 can be embedded in the second transverse member 38. Alternatively, the insert 40 can be operatively connected to an outer surface of the second transverse member 38.

Figure 10:
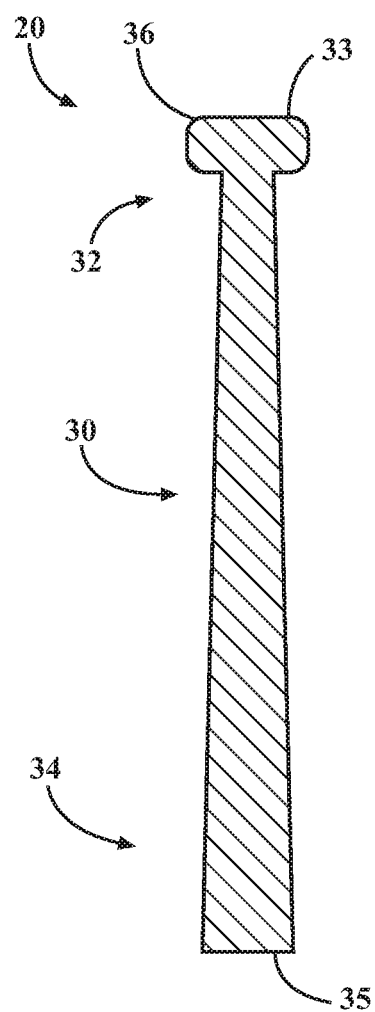
FIG. 10 is an example of an interface seal that is substantially T-shaped in cross-section.

It should be noted that, in some arrangements, the interface seal 20 may include the first transverse member 36, but not the second transverse member 38. In such case, the interface seal 20 can be substantially T-shaped in cross-section, and the second end 35 of the interface seal 20 can be defined by an end of the central member 30. An example of such an interface seal is shown in FIG. 10.

In one or more arrangements, the first transverse member 36 can extend along substantially the entire length of the interface seal 20. In one or more arrangements, there can be a plurality of first transverse members 36. In such case, the plurality of first transverse members 36 can be spaced along the length of the interface seal 20.

In one or more arrangements, the interface seal 20 can be made of a plurality of portions. In one or more arrangements, the plurality of portions can be joined together in any suitable manner, such as by one or more fasteners, one or more adhesives, and/or one or more forms of mechanical engagements, just to name a few possibilities. Alternatively, the plurality of portions may not be attached to each other.

One example of the interface seal 20 being made of a plurality of portions is shown in FIG. 5. The interface seal 20 can include a first seal portion 20a and a second seal portion 20b. In this example, the first seal portion 20a can define a portion of the central member 30 and the first end region 32. The second seal portion 20b can defined a portion of the central member 30 and the second end region 34. The central member 30 of the first seal portion 20a and the central member 30 of the second seal portion 20b can be configured for telescopic engagement. As an example, the central member 30 of the second seal portion 20b can be hollow and can receive at least a portion of the central member 30 of the first seal portion 20a, as is shown in FIG. 5. In such case, the first seal portion 20a and the second seal portion 20b can move relative to each other at least in a direction that is substantially parallel to an axis 50 of the interface seal 20.

Figure 6:
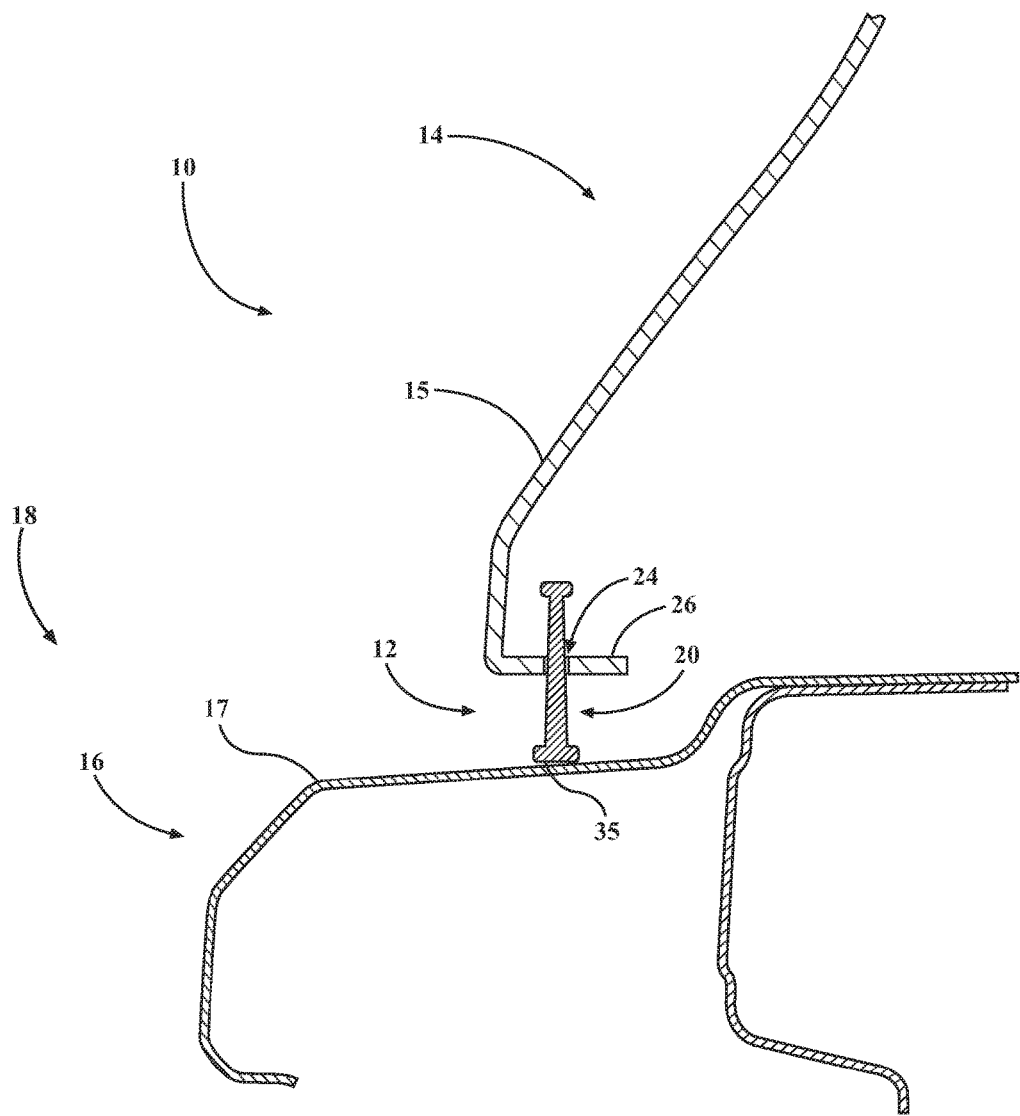
FIG. 6 is a cross-sectional view of the interface between two vehicle components, viewed along line A-A in FIG. 1 and showing an example of a minimum gap condition between the two vehicle components.
Figure 7:
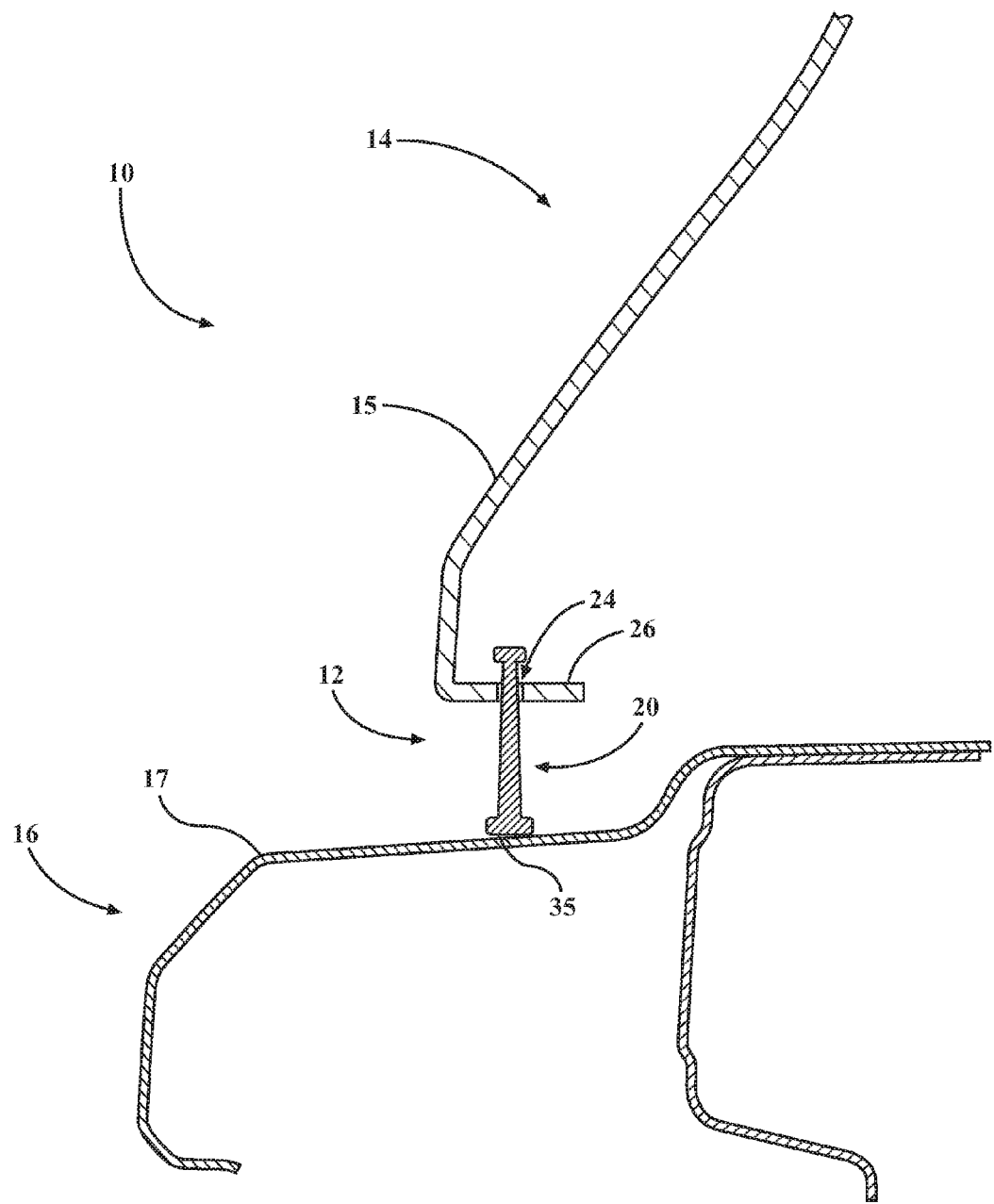
FIG. 7 is a cross-sectional view of the interface between two vehicle components, viewed along line A-A in FIG. 1 and showing an example of a nominal gap condition between the two vehicle components.

The interface seal 20 can be provided in the interface gap 12 in any suitable manner. In one or more arrangements, the interface seal 20 can be directly floatingly connected to the first vehicle component. "Directly floatingly connected" means that the interface seal is coupled to the first vehicle component without the use of fasteners or adhesives. "Directly floatingly connected" can also include the interface seal being retained on the first vehicle component so as to not be readily separated therefrom at least during expected operational conditions, while also allowing the interface seal and the first vehicle component to move relative to each other. The interface seal 20 can be directly floatingly connected to the first vehicle component 14 in any suitable manner. For instance, the first vehicle component 14 can include one or more apertures 24 (FIGS. 6-8). The aperture(s) 24 can have any suitable configuration. For instance, the aperture(s) 24 can be one or more holes, slots, or other openings in a portion of the first vehicle component 14. The aperture(s) 24 can be provided in any suitable portion of the first vehicle component 14, such as on a flange 26 thereof.

A portion of the interface seal 20 can be received in the aperture(s) 24. For example, the interface seal 20 can be received in the aperture(s) 24 such that at least the first end region 32 of the interface seal 20 is located on one side of the first vehicle component 14 and such that at least the second end region 34 of the interface seal 20 is located on an opposite side of the first vehicle component 14, as is shown in FIGS. 6-8. A portion of the central member 30 of the interface seal 20 can be located on one side of the first vehicle component 14, and a second portion of the central member 30 can be located on the other side of the first vehicle component 14 in at least some operational conditions (see, e.g., FIG. 6).

In one or more arrangements, the first transverse member 36 of the interface seal 20 can be configured to facilitate installation of the interface seal 20 into the aperture(s) 24. For instance, a portion of the first transverse member 36 can be chamfered or angled. The central member 30 of the interface seal 20 and/or the aperture(s) 24 can be sized so as to allow movement between the interface seal 20 and the first vehicle component 14. The first transverse member 36 can be sized so that it cannot be readily pass through the aperture(s) 24 during expected operational conditions.

In one or more arrangements, the interface seal 20 can be indirectly floatingly connected to the first vehicle component 14. "Indirectly floatingly connected" means that the interface seal is coupled to a connecting member (e.g., connecting member 22) without the use of fasteners or adhesives and the connecting member is connected to the first vehicle component. "Indirectly floatingly connected" can also include the interface seal being retained on the connecting member so as to not be readily separated therefrom at least during expected operational conditions, while also allowing the interface seal and the connecting member (and the first vehicle component) to move relative to each other.

The interface seal 20 can be indirectly floatingly connected to the first vehicle component 14 in any suitable manner. One example of the interface seal 20 being indirectly floatingly connected to the first vehicle component 14 is shown in FIG. 9. In this example, the connecting member 22 can include one or more apertures 28. The aperture(s) 28 can have any suitable configuration. For instance, the aperture(s) can be one or more holes, slots, or other openings in a portion of the first vehicle component 14.

A portion of the interface seal 20 can be received in the aperture(s) 28. For example, the interface seal 20 can be received in the aperture(s) 28 such that at least the first end region 32 of the interface seal 20 is located on one side of the connecting member 22 and such that at least the second end region 34 of the interface seal 20 is located on an opposite side of the connecting member 22. A portion of the central member 30 of the interface seal 20 can be located on one side of the connecting member 22, and a second portion of the central member 30 can be located on the other side of the connecting member 22, as is shown in FIG. 9.

In one or more arrangements, the first transverse member 36 of the interface seal 20 can be configured to facilitate installation of the interface seal 20 into the aperture(s) 28. For instance, a portion of the first transverse member 36, such as corners thereof, can be chamfered or angled. The central member 30 of the interface seal 20 and/or the aperture(s) 28 can be sized so as to allow movement between the interface seal 20 and the connecting member 22. The first transverse member 36 can be sized so that it cannot readily pass through the aperture(s) 28 during expected operational conditions.

The second end 35 of the interface seal 20 can be substantially adjacent to the second vehicle component 16. "Substantially adjacent" can include direct contact between the second end 35 of the interface seal 20 and the second vehicle component 16. "Substantially adjacent" can include slight spacing between the second end 35 of the interface seal 20 and the second vehicle component 16. The second end 35 of the interface seal 20 can sealingly engage the second vehicle component 16. In one or more arrangements, the interface seal 20 is not connected to the second vehicle component 16. The second end 35 of the interface seal 20 and/or the portion of the second vehicle component 16 can be configured to allow for substantial mating engagement between the two components. In one or more arrangements, the second end 35 and a portion of the second vehicle component 16 can be substantially planar. In one or more arrangements, the second end 35 of the interface seal 20 can be configured to remain substantially adjacent to the second vehicle component 16 by gravity. It should be noted that the height H (FIG. 3) of interface seal 20 can be sized so that, during expected operational conditions, the second end 35 can remain substantially adjacent to the second vehicle component 16 or so that separation between the second end 35 of the interface seal 20 and the second vehicle component 16 is minimized.

In one or more arrangements, the portion of the second vehicle component 16 that is substantially adjacent to the second end of the interface seal 20 can be protected. As an example, a protective tape 60 (FIG. 9), an anti-chipping tape, and/or other protective element can be provided on the second vehicle component 16. Such protection can also be provided on the first vehicle component 14 at the portions that contact or that are substantially adjacent to the interface seal 20.

It should be noted that neighboring portions of the interface seal 20, the first vehicle component 14, and/or the second vehicle component 16 can be configured to facilitate relative movement between the parts. For instance, at least a portion of the interface seal 20, at least a portion of the first vehicle component 14, and/or at least a portion of the second vehicle component 16 can be coated with a friction coating 62 (FIG. 9). As an example, the friction coating 62 can be a silicone spray. Alternatively or in addition, at least a portion of the interface seal 20, at least a portion of the first vehicle component 14, and/or at least a portion of the second vehicle component 16 can be grained or otherwise treated to provide surfaces that facilitate relative movement between them.

FIGS. 6-8 show a cross sectional view of the interface between the first vehicle component 14 and the second vehicle component 16, viewed along line A-A in FIG. 1, at various operational conditions. In these examples, the width W of the gap can vary due to the movement of first vehicle component 14 and/or the second vehicle component 16.

FIG. 6 shows an example of a minimum gap condition between the first vehicle component 14 and the second vehicle component 16, which can be at a front end 18 of the vehicle 10. Thus, the first vehicle component 14 and the second vehicle component 16 can be at their expected closest point to each other. Thus, the width W of the interface gap 12 is at its smallest expected size. As is shown, the second end 35 of the interface seal 20 can be substantially adjacent to the second vehicle component 16. In some minimum gap conditions, about half of the height H of the interface seal 20 can be located above the flange 26 of the first vehicle component 14, and about half of the height H of the interface seal 20 can be located below the flange 26 of the first vehicle component 14.

FIG. 7 shows an example of a nominal gap condition between the first vehicle component 14 and the second vehicle component 16. As is shown, the second end 35 of the interface seal 20 can be substantially adjacent to the second vehicle component 16. In some nominal gap conditions, a greater portion of the length L of the interface seal 20 can be located below the flange 26 of the first vehicle component 14 compared to above the flange 26.

FIG. 8 shows an example of a maximum gap condition between the first vehicle component 14 and the second vehicle component 16. Thus, the first vehicle component 14 and the second vehicle component 16 can be at their expected farthest point to each other. Thus, the width of the gap is at its largest expected size. As is shown, the second end 35 of the interface seal 20 can be substantially adjacent to the second vehicle component 16. In some maximum gap conditions, a greater portion of the height H of the interface seal 20 can be located below the flange 26 of the first vehicle component 14 compared to above the flange 26. More particularly, a substantial majority of the height H of the interface seal 20 can be located below the flange 26 of the first vehicle component 14 compared to above the flange 26. In this arrangement, the first transverse member 36 of the interface seal 20 can contact or can be substantially adjacent to the first vehicle component 14.

It should be noted that arrangements described herein can also accommodate relative movement between the first vehicle component 14 and the second vehicle component 16 in the longitudinal direction of the vehicle 10 (e.g., left to right and/or right to left in FIGS. 6-8). In such case, the interface seal 20 can flex to accommodate such movement while maintaining the second end 35 of the interface seal 20 substantially adjacent to the second vehicle component 16. It will be appreciated that arrangements described herein can, alternatively or in addition, accommodate relative movement between the first vehicle component 14 and the second vehicle component 16 in a lateral direction of the vehicle 10 (e.g., into and/or out of the page in FIGS. 6-8).

It will be appreciated that arrangements described herein can provide numerous benefits, including one or more of the benefits mentioned herein. For example, arrangements described herein can minimize airflow and turbulence at the front end of a vehicle. Arrangements described herein can facilitate improved vehicle aerodynamics. Arrangements described herein can increase vehicle gas mileage. Arrangements described herein can increase overall vehicle efficiency. Arrangements described herein can improve the aesthetic appearance of an interface between vehicle components. Arrangements described herein can minimize the infiltration of water, dirt, and/or other substances into an interface between vehicle components.

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all possible combinations of one or more of the associated listed items. As an example, the phrase "at least one of A, B and C" includes A only, B only, C only, or any combination thereof (e.g., AB, AC, BC or ABC).

Aspects herein can be embodied in other forms without departing from the spirit or essential attributes thereof. Accordingly, reference should be made to the following claims, rather than to the foregoing specification, as indicating the scope of the invention.

What is claimed is:

1. A sealing system for a vehicle comprising:
    a first vehicle component, the first vehicle component defining an aperture;
    a second vehicle component, the first vehicle component and the second vehicle component being spaced from each other such that a gap is formed between the first vehicle component and the second vehicle component; and
    an interface seal operatively positioned at least partially between the first vehicle component and the second vehicle component to close at least a portion of the gap, the interface seal including an elongated central portion and a first transverse member at a first end of the central portion such that the interface seal is substantially I-shaped or substantially T-shaped in overall cross-section,
    the central portion being received in the aperture to permit relative movement between the interface seal and the first vehicle component, the interface seal being free floating within the aperture with respect to the first vehicle component,
    a width of the first transverse member being larger than the aperture, whereby the interface seal being at least partially retained in the aperture by the first transverse member,
    the interface seal being substantially adjacent to the second vehicle component, and the interface seal being unconnected to the second vehicle component.

2. The sealing system of claim 1, wherein the gap has a width, and wherein the width of the gap is variable during operation of the vehicle.

3. The sealing system of claim 1, wherein the first vehicle component is a filler panel, and wherein the second vehicle component is a bumper panel.

4. The sealing system of claim 1, wherein the first vehicle component is spaced from the second vehicle component in a substantially vertical direction.

5. The sealing system of claim 1, wherein the interface seal includes a second transverse member at a second end of the central portion, the second end being opposite the first end, a width of the second transverse member being larger than the aperture, whereby the interface seal is at least partially retained in the aperture by the second transverse member.

6. The sealing system of claim 5, further including a metal insert operatively connected to the second transverse member, whereby the second transverse member weighs more than the first transverse member.

7. The sealing system of claim 1, wherein at least a portion of at least one of the interface seal, the first vehicle component, or the second vehicle component is coated with a friction coating.

8. The sealing system of claim 1, further including a protective tape provided on at least one of the first vehicle component and the second vehicle component at a contact point between the interface seal and at least one of the first vehicle component or the second vehicle component.

9. The sealing system of claim 1, wherein the interface seal extends non-linearly in a longitudinal direction.

10. The sealing system of claim 5, wherein the central portion of the interface seal tapers in a direction from the second end to the first end, whereby a width of the central portion at the second end is greater than a width of the central portion at the first end.

11. The sealing system of claim 5, wherein the interface seal is substantially I-shaped in cross-section.

12. The sealing system of claim 5, wherein the second transverse member is larger than the first transverse member.

13. A sealing system for a vehicle comprising:
a first vehicle component;
a connecting member connected to the first vehicle component, the connecting member being a separate structure from the first vehicle component, an aperture being defined by the connecting member;
a second vehicle component, the first vehicle component and the second vehicle component being spaced from each other such that a gap is formed between the first vehicle component and the second vehicle component; and
an interface seal operatively positioned at least partially between the first vehicle component and the second vehicle component to close at least a portion of the gap, the interface seal including an elongated central portion and a first transverse member at a first end of the central portion such that the interface seal is substantially I-shaped or substantially T-shaped in overall cross-section,
the central portion being received in the aperture to permit relative movement between the interface seal and the first vehicle component, the interface seal being free floating within the aperture with respect to the first vehicle component,
a width of the first transverse member being larger than the aperture, whereby the interface seal being at least partially retained in the aperture by the first transverse member,
the interface seal being substantially adjacent to the second vehicle component, and the interface seal being unconnected to the second vehicle component.

14. The sealing system of claim 13, wherein the interface seal includes a second transverse member at a second end of the central portion, the second end being opposite the first end, a width of the second transverse member being larger than the aperture, whereby the interface seal being at least partially retained in the aperture by the second transverse member.

15. The sealing system of claim 14, further including a metal insert operatively connected to the second transverse member, whereby the second transverse member weighs more than the first transverse member.

16. The vehicle of claim 14, wherein the interface seal is substantially I-shaped in cross-section.

17. A vehicle comprising:
a first vehicle component, the first vehicle component defining an aperture;
a second vehicle component, the first vehicle component and the second vehicle component being spaced from each other in a substantially vertical direction such that a gap is formed between the first vehicle component and the second vehicle component, the gap having a width, and the width of the gap being variable during operation of the vehicle; and
an interface seal operatively positioned at least partially between the first vehicle component and the second vehicle component to close at least a portion of the gap, the interface seal including an elongated central portion and a first transverse member at a first end of the central portion, the central portion including a second end opposite the first end, the interface seal being substantially I-shaped or substantially T-shaped in overall cross-section,
the central portion being received in the aperture to permit relative movement between the interface seal and the first vehicle component, the interface seal being free floating within the aperture with respect to the first vehicle component,
a width of the first transverse member being larger than the aperture, whereby the interface seal being at least partially retained in the aperture by the first transverse member,
the interface seal being substantially adjacent to the second vehicle component, and the interface seal being unconnected to the second vehicle component.

18. The vehicle of claim 17, wherein the first vehicle component and the second vehicle component are located on an exterior of the vehicle and at a front end of the vehicle.

19. The vehicle of claim 17, wherein the interface seal includes a second transverse member at a second end of the central portion, wherein the second end is opposite the first end, wherein a width of the second transverse member being larger than the aperture, whereby the interface seal is at least partially retained in the aperture by the second transverse member.

20. A vehicle comprising:
a first vehicle component;
a connecting member connected to the first vehicle component, the connecting member being a separate structure from the first vehicle component, an aperture being defined by the connecting member;
a second vehicle component, the first vehicle component and the second vehicle component being spaced from each other in a substantially vertical direction such that a gap is formed between the first vehicle component and the second vehicle component, the gap having a width, and the width of the gap being variable during operation of the vehicle; and
an interface seal operatively positioned at least partially between the first vehicle component and the second vehicle component to close at least a portion of the gap, the interface seal including an elongated central portion and a first transverse member at a first end of the central portion such that the interface seal is substantially I-shaped or substantially T-shaped in overall cross-section, the central portion being received in the aperture to permit relative movement between the interface seal and the first vehicle component, the interface seal being free floating within the aperture with respect to the first vehicle component,
a width of the first transverse member being larger than the aperture, whereby the interface seal being at least partially retained in the aperture by the first transverse member,
the interface seal being substantially adjacent to the second vehicle component, and the interface seal being unconnected to the second vehicle component.

* * * * *